(12) United States Patent
Dumitrescu

(10) Patent No.: US 10,401,893 B2
(45) Date of Patent: Sep. 3, 2019

(54) PEDAL SYSTEM

(71) Applicant: Constantin Alexandru Dumitrescu, St. Catharines (CA)

(72) Inventor: Constantin Alexandru Dumitrescu, St. Catharines (CA)

( * ) Notice: Subject to any disclaimer, the term of this patent is extended or adjusted under 35 U.S.C. 154(b) by 619 days.

(21) Appl. No.: 14/806,129

(22) Filed: Jul. 22, 2015

(65) Prior Publication Data
US 2015/0355669 A1     Dec. 10, 2015

Related U.S. Application Data

(63) Continuation-in-part of application No. 13/576,678, filed as application No. PCT/CA2011/050064 on Feb. 3, 2011, now abandoned.

(51) Int. Cl.
*G05G 1/36*     (2008.04)
*G05G 1/44*     (2008.04)
(Continued)

(52) U.S. Cl.
CPC ............... *G05G 1/44* (2013.01); *B60K 26/02* (2013.01); *B60T 7/06* (2013.01);
(Continued)

(58) Field of Classification Search
CPC .. G05G 1/30; G05G 1/34; G05G 1/36; G05G 1/38; G05G 1/44; G05G 1/445; G05G 1/46; G05G 1/48; G05G 1/483; G05G 1/487; G05G 1/54; G05G 5/005; G05G 5/05; B60K 26/02; B60T 7/02; B60T 7/04

See application file for complete search history.

(56) References Cited

U.S. PATENT DOCUMENTS 1,879,859 A * 9/1932 Stinson .................. B64C 25/48
                                                         244/111
2,033,433 A * 3/1936 Leupold ................ B60W 10/04
                                                         188/106 R
(Continued)

OTHER PUBLICATIONS

"Team O'Neil in the Press," May 2002, <URL: http://www.team-oneil.com/press4.htm>, obtained Mar. 28, 2018.*
(Continued)

*Primary Examiner* — Richard W Ridley
*Assistant Examiner* — Brian J McGovern

(57) ABSTRACT

A pedal system containing a right foot pedal, a left foot pedal and a motion inverter mechanism. The right foot pedal is moveable from a right foot pedal neutral position to a depressed acceleration position. The left foot pedal is moveable from a left foot pedal neutral position to a depressed braking position. The motion inverter mechanism operatively couples to the right and left foot pedals, for movement of the right foot pedal or the left foot pedal in an opposite direction to a raised position upon depression of the other of the right foot pedal or the left foot pedal. Also disclosed is a method of preventing concurrent depression of the gas and brake pedal. The pedal system disclosed can allow left foot braking and can also prevent concurrent depression of the gas and brake pedals, and hence, avoid stalling an automobile. The pedal system may also be installed with "drive by wire" type automobiles.

14 Claims, 22 Drawing Sheets

(51) Int. Cl.
*B60K 26/02* (2006.01)
*B60T 7/06* (2006.01)
*B60W 30/18* (2012.01)
*G05G 5/08* (2006.01)

(52) U.S. Cl.
CPC ......... *B60W 30/18181* (2013.01); *G05G 5/08* (2013.01); *G05G 1/36* (2013.01); *Y10T 74/20189* (2015.01)

(56) References Cited

U.S. PATENT DOCUMENTS

| | | | | |
|---|---|---|---|---|
| 3,240,299 | A * | 3/1966 | Buchwald | G05G 1/60 477/211 |
| 3,943,712 | A * | 3/1976 | Stuhr | B60K 23/00 60/327 |
| 4,152,951 | A * | 5/1979 | Korczykowski | B60T 7/04 137/625.65 |
| 5,838,307 | A * | 11/1998 | Bouton | A63F 13/06 345/168 |
| 6,357,232 | B1 * | 3/2002 | Strashny | B66F 9/06 60/431 |
| 6,364,047 | B1 * | 4/2002 | Bortolon | B60K 23/02 180/334 |
| 2012/0279340 | A1 * | 11/2012 | Davis | B66C 13/56 74/484 R |

OTHER PUBLICATIONS

Tandler Product Catalogue, Aug. 2009, <URL: http://www.tandler.de:80/download/spiralkegel.pdf>, obtained Mar. 29, 2018.*

* cited by examiner

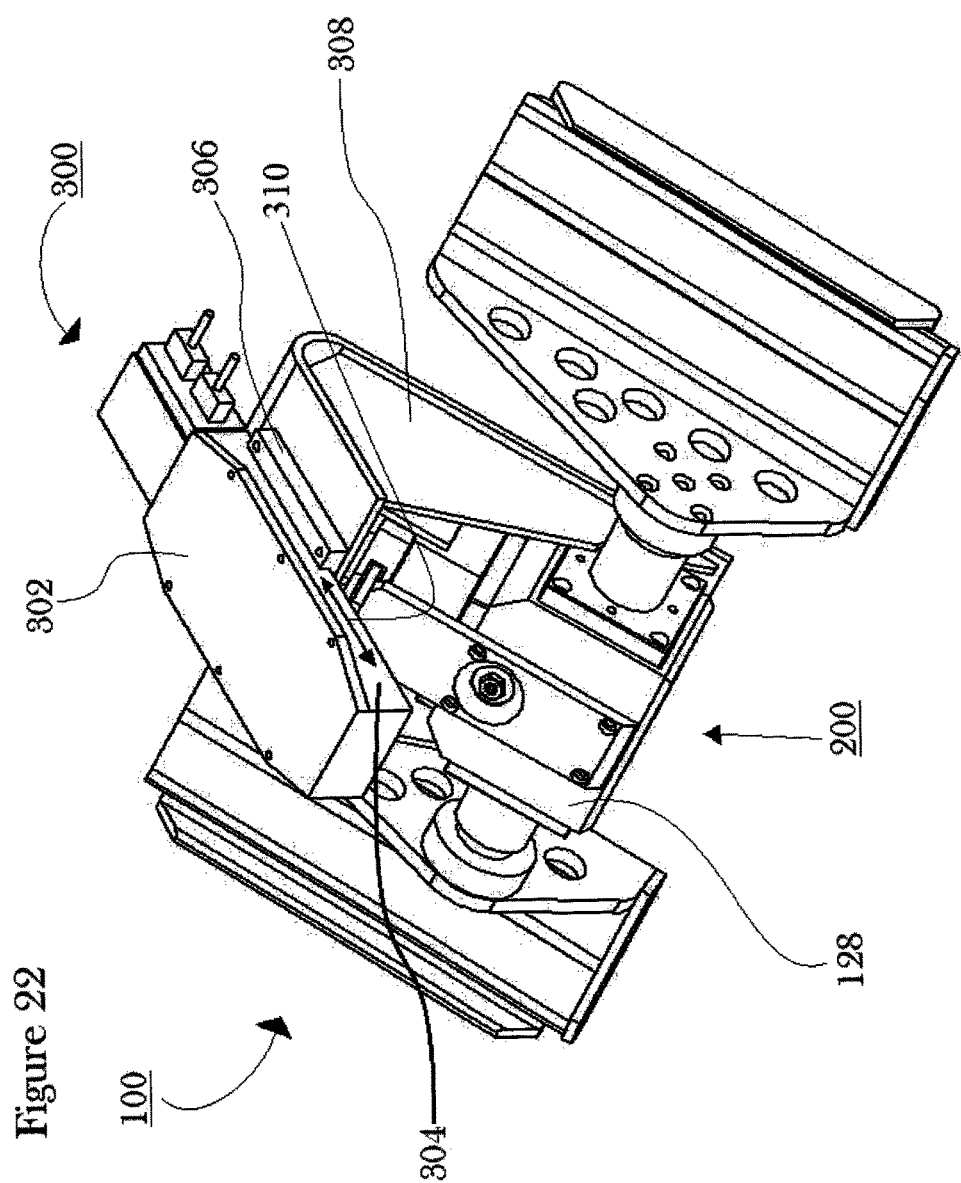

PEDAL SYSTEM

The present application is a continuation-in-part of prior application Ser. No. 13/576,678, filed Aug. 2, 2012, which is hereby entirely incorporated by reference and claims priority from previously filed PCT Application PCT/CA11/50064 filed on Feb. 3, 2011 under the title Pedal System and Canadian Patent Application no. 2,692,106 filed Feb. 3, 2010 under the title VEHICLE PEDAL SYSTEM both by Constantin Alexandru Dumitrescu.

TECHNICAL FIELD

Some example embodiments relate to a pedal system that can be used in an automobile.

BACKGROUND

Automobiles have at least two pedals for speed modulation: the gas pedal for acceleration and the brake pedal for decelerating and stopping the vehicle. The location of both these pedals in the vehicle allows operation by only the right foot of the driver. Therefore, driver needs to move the right foot from one pedal to the other.

Automobiles equipped with automatic gearboxes also have two pedals for modulating speed: a gas pedal for acceleration and a brake pedal for decelerating and stopping. In such vehicles, the two pedals are located in front of the driver on the right side, so the driver uses only his/her right foot to operate either pedal. The main reason for preserving this historic arrangement from standard vehicles is that this way the driver cannot operate both pedals simultaneously, consequently stalling the engine and losing control of the vehicle.

This typical pedal arrangement has at least the following inconveniences:

Moving the right foot from the gas pedal to the brake pedal requests a time that adds to the braking time, i.e. the time spent from the moment the driver decides to apply the brakes to the moment the vehicle comes to a full stop;

Drivers with right foot/leg mobility problems may take more time to move from one pedal to the other. They may also experience pain in the right foot/leg, which can constitute a distraction from the task of driving;

Professional drivers experience pain in their right knee more often than occasional ones, in a statistically significant manner. This is the result of excessive wear of the knee due to repetitive motion of the leg, required to operate both pedals.

Some drivers try to address these deficiencies by left foot braking. Unfortunately, the location of the brake pedal, being meant for use with the right foot, makes its operation by the left foot rather awkward. In addition to that, reacting inertial loads is more difficult without the left foot firmly supported by the dead pedal. Another issue with left foot braking is the possibility of simultaneously pressing both pedals and consequently stalling the engine and by that losing control of the vehicle. Even drivers who regularly use this mode of operating the vehicle pedals admit that such an event may occur in a moment of panic.

Another attempt at correcting the second deficiency consists in mounting a device over the existent pedals transforming them from right foot pedals to left foot pedals. Such a design is good for drivers who cannot use but their left foot for operating the vehicle pedals. Nevertheless, this is still a one-foot solution and in fact transforms all the drawbacks generated by the right-foot-only operation of the pedals into drawbacks created by a left-foot-only operation.

Other difficulties with conventional systems would be appreciated in view of the description below.

SUMMARY OF THE INVENTION

In one example embodiment, there is provided a pedal system including a right foot pedal moveable from a right foot pedal neutral position to a right foot pedal depressed position, a left foot pedal moveable from a left foot pedal neutral position to a left foot pedal depressed position, and a motion inverter mechanism operatively coupled to the right and left foot pedals, for movement of the right foot pedal or the left foot pedal in an opposite direction to a raised position upon depression of the other of the right foot pedal or the left foot pedal.

In another example embodiment, there is provided a method of preventing concurrent depression of a left foot pedal and a right foot pedal by using a motion inverter mechanism operatively coupled to the right and the left foot pedals. The method comprising the steps of: depressing the right foot pedal from a right foot pedal neutral position to a right foot pedal depressed position, and wherein the motion inverter mechanism is for moving of the left foot pedal in an opposite direction from a left foot pedal neutral position to a left foot pedal raised position upon depression of the right foot pedal.

In yet another example embodiment, there is provided a method for operating a pedal system, comprising moving a right food pedal or a left foot pedal from a neutral position to a depressed position, and moving the other of the right food pedal or the left foot pedal in an opposite direction to a raised position from the neutral position using a motion inverter mechanism operatively coupled between the right and left foot pedals.

An alternate embodiment of a pedal system for controlling the throttle and brake in a vehicle, the system including; a right foot pedal and a left foot pedal pivotally connected about a pivot axis to a motion inverter, the pedals include a neutral position; the motion inverter mounted in between the spaced apart right and left foot pedals such that depressing the pedal heel and pedal toe of one pedal pivots the other pedal in opposite directions; a device for sensing the position of the pedals and electronically communicating the pedal position to a controller, such that depressing the toe of the right pedal beyond the neutral position proportionately increases a vehicle throttle, whereas depressing the toe of the left pedal beyond the neutral position proportionately increases a vehicle brake; and wherein the right and left pedals include planar foot pads for receiving the foot sole thereon such that the pivot axis is above the planar foot pad and between the pedal toe and pedal heel. The pedal neutral position is defined as the position of the pedal which does not actuate the throttle or brake. It is understood that either the right foot pedal or left foot pedal may be used independently to actuate the throttle and brake due to the motion inverter which links the two pedals together.

Preferably wherein the pivot axis coincides substantially with the pivot axis of the tibio-tarsal joint of a foot when a foot sole is contacting the foot pad.

Preferably wherein the foot pedals including vertically upstanding inboard side guides oriented perpendicular to the foot pad.

Preferably wherein the foot pedals further including vertically upstanding outboard side guards oriented perpendicular to the foot pad.

Preferably wherein the foot pedal further including a vertically upstanding heel rest oriented perpendicular to the foot pad.

Preferably wherein the motion inverter including right and left pedal shafts oriented along the pivot axis pivotally mounted to the right and left inboard side guides.

Preferably, wherein the pivot axis coincides substantially with the pivot axis of the tibio-tarsal joint of a foot when a foot sole is contacting the foot pad.

Preferably wherein the motion inverter includes a housing with left and right rocker arms connected to the left and right pedal shafts, each rocker arm engaging with an idler shaft such that clockwise rotation of one rocker arm translates to counter clockwise rotation of the other rocker arm.

Preferably wherein the motion inverter includes a centering magnet with a set of magnetic poles mounted onto an inboard end of the idler shaft and a spring magnet with a cooperating set of magnetic poles mounted onto a magnet holder such that like pole repulsion unlike pole attraction is used to return the pedals to the neutral position.

Preferably wherein the device for sensing further includes a sensor tab attached to the housing, the tab for supporting a position sensor, the position sensor interacting with a sensor reference mounted onto an outboard end of the idler shaft such that the sensor reference pivots through the position sensor indicating the position of the foot pads.

Preferably wherein the idler shaft includes an idler yoke with a yoke dimple, the yoke dimple for engaging with a ball of a spring and ball plunger for positively indexing the neutral position.

Preferably wherein the left and right pedal shafts mounted pivotally into flanged pedal bearings.

Preferably wherein the left and right rocker arms include gear teeth which mesh with gear teeth rigidly connected to the idler shaft for a geared connection between the rocker arms and the idler shaft. Preferably including a shim washer for centering the left and right pedal shafts in the housing and for adjusting the gear mesh play by adjusting the thickness of the shim washer.

Preferably wherein the housing connected to a floor mounting bracket for rigidly connecting the pedal system above the floor such that the pedals do not contact the floor.

Preferably wherein the housing connected to a steering column mounting bracket for rigidly connecting the pedal system the steering column such that the pedals do not contact the floor.

Preferably wherein the housing connected to a seat mounting bracket for rigidly connecting the pedal system to a vehicle seat.

Preferably wherein the motion inverter further includes a shim for adjusting the spacing between the centering magnet and the spring magnet.

Preferably wherein the housing is connected to an indexing rail system for slidably connecting the pedal system to a vehicle structure such that pedal position can be indexed selectively.

The present concept is also a method of applying the brake and the throttle in a vehicle including the steps of: providing a a right foot pedal and a left foot pedal pivotally connected about a pivot axis to a motion inverter, the pedals include a neutral position, wherein the motion inverter mounted in between the spaced apart right and left foot pedals such that the right foot pedal and left foot pedal pivot in opposite directions; wherein the right and left pedals include planar foot pads for receiving the foot sole thereon such that the pivot axis is above the planar foot pad and between the pedal toe and pedal heel; depressing the toe of the right pedal or depressing the pedal heel of the left pedal beyond the neutral position proportionately increases a vehicle throttle; and depressing the toe of the left pedal or depressing the pedal heel of the right pedal beyond the neutral position proportionately increases a vehicle brake.

BRIEF DESCRIPTION OF THE DRAWINGS

The device will now be described by way of example only with reference to the following drawings:

FIG. 10 B shows an embodiment of a torsion spring that is compressed for use in an embodiment of the pedal system.

FIG. 22 is a front perspective view of an alternate embodiment of the pedal system having an indexing rail system for positional adjustment.

DETAILED DESCRIPTION OF THE PREFERRED EMBODIMENT

Figure 1:
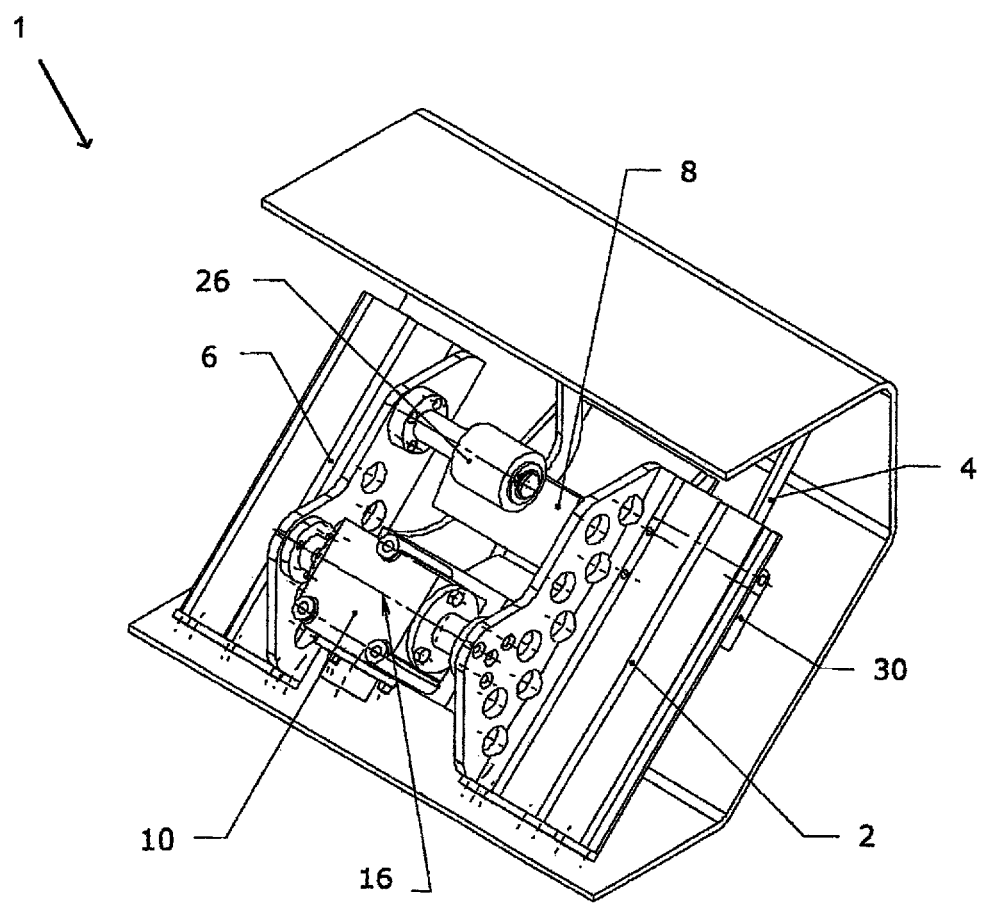
FIG. 1 is an isometric view of an example embodiment of the pedal system in accordance with an example embodiment.

It would be advantageous to provide a pedal system that allows left foot braking, while allowing acceleration using the right foot. In addition, it would be advantageous to provide a pedal system that can mitigate the detrimental impact of the current pedals present in an automobile. Moreover, it would be advantageous to provide a pedal system that allows for left foot braking and may be installed for use on the existing pedals of an automobile.

Example embodiments relate to a pedal system (1), where the driver uses both feet to modulate the speed of the vehicle. Both feet are fully supported by the two pedals of the system (1). As a result, the driver can both modulate vehicle speed and react to inertial forces, which act upon his/her body during the operation of the vehicle, without changing feet location. In one embodiment, the specification discloses a pedal system (1) for use with a two pedal car, to modulate the vehicle speed: accelerate, decelerate and eventually stop the vehicle.

Example embodiments will be further described with reference to the accompanying figures that disclose a pedal system (1) featuring a right foot pedal (2) and a left foot pedal (6) that are mechanically connected through a motion inverter means (10) including a motion inverter mechanism, which facilitates opposing movement of the right and left foot pedals (2, 6) in opposite directions. This pedal system (1) can be mounted over and act upon the existing pedals in the vehicle: the right foot pedal (2) can act upon the gas pedal (4) into an acceleration position and the left foot pedal (6) activates the brake pedal (8) into a braking position. In a neutral position, neither foot pedal (2, 6) is depressed. When the driver depresses one pedal down, the motion inverter means (10) oppositely moves the other pedal up into a raised position with respect to the neutral position. This feature of the design inhibits the driver from pressing both the gas pedal (4) and the brake pedal (8) at the same time, therefore reducing the risks associated with left foot braking, i.e. stalling the engine or wearing down the braking system.

In one embodiment, for example and without limitation, the pedal systems (1) pedals (2, 6) are rotatively coupled and rotate about an axis (16) that falls close to a same axis as the driver's ankles. Therefore, the driver needs only to flex his/her feet from the ankle to operate the pedals (2, 6). This can require much less effort than the current automotive pedals (4, 8), as the effort that is required is shared by both feet and is provided by the ankle muscles, which are amongst the strongest muscles in the human body. This way of operating the pedals can also allow the driver to react to inertial forces, which may occur during driving, through his/her feet without having to change the position of the pedals (2, 6) and therefore maintaining the intended speed of the vehicle.

At all times, the driver may keep both feet firmly planted on the two pedals (2, 6), with no contact with the vehicle floor, modulating the vehicle speed by depressing the right foot pedal (2) to accelerate or, alternatively, depressing the left foot pedal (6) to slow down the vehicle. This is one mode of operation, as driver can maintain control over the vehicle with little effort and significant efficiency. This is similar to keeping both hands on the steering wheel. This mode of operation allows the driver to react to inertial loads. However, if necessity arises, the pedal system (1) may be operated with one foot only, either left or right.

In another embodiment, the pedal system (1) contains a motion inverter means (10) including a motion inverter mechanism, having a right foot pedal coaxial shaft (12) and a left foot pedal coaxial shaft (14) that protrude from the opposite ends of the inverter (10) housing in opposite directions. The motion inverter means (10) facilitates opposing movement between the right and the left foot pedals (2, 6). The motion inverter means (10) can be of any nature (mechanical, hydraulic etc.) and of any design as long as the output shafts (12, 14) are coaxial and rotate in opposite directions. A bracket (18) supports the motion inverter means (10) and thus connects the pedal system (1) to the vehicle structure.

As noted above, the motion inverter means (10) used in accordance with the specification is not particularly limited, and can be, for example and without limitation, a three-bevel-gear motion inverter. The three-bevel-gear motion inverter can be a commercially available product, for example and without limitation, it can be Tandler™ unit having part no. is STD 00 1:1 EA-II, as would be understood in the art. The three-bevel-gear motion inverter can contain, as its name indicates, three bevel or miter gears meshing in sequence 1-2-3. Gears 1 and 3 are mounted on collinear shafts, facing each other and both meshing with gear 2. If gear 1 is the driver, its teeth that engage gear 2 push the latter's teeth in a certain direction. As gear 2 rotates, its diametrically opposed teeth engage gear 3, turning it in the opposite direction. If gear 3 drives in a certain direction, then gear 2 will move gear 1 in the opposite direction. Therefore, gears 1 and 3 can work either way, as driving or driven gears, while gear 2 only transfers and inverts the motion in between them. Additional information about the Tandler™ three-bevel-gear motion inverter can also be found on www.tandler.co.uk.

In another embodiment, for example and without limitation, the motion inverter means can be a hydraulic/pneumatic motion inverter that consists of two rotary actuators, such as vane actuators, installed in-line, butting each other and having their ports connected in such a way as to produce motion in opposite directions. Each pedal is rigidly mounted on the shaft of the associated vane. When one pedal is pressed, it will rotate its vane in a certain direction, sending the power fluid (oil or air) to the other actuator, moving its vane and therefore the other pedal, in the opposite direction because of the cross-connection of the ports.

Figure 2:
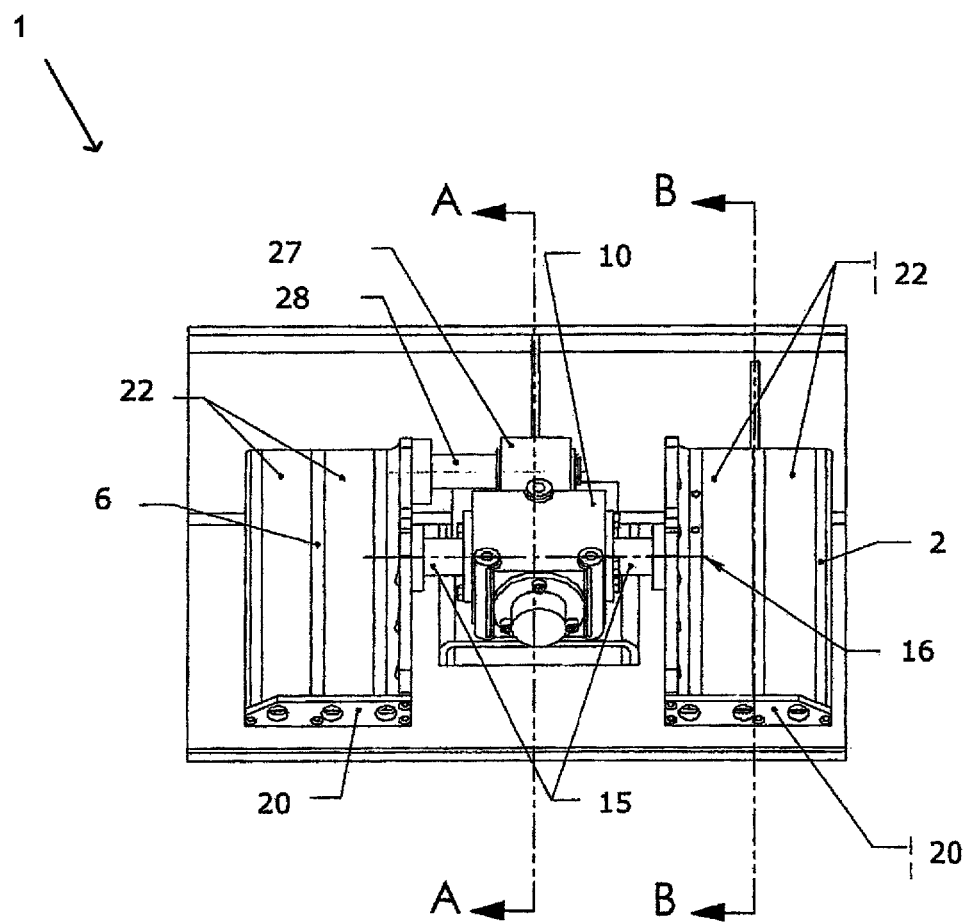
FIG. 2 is a front view of the pedal system of FIG. 1.
Figure 3:
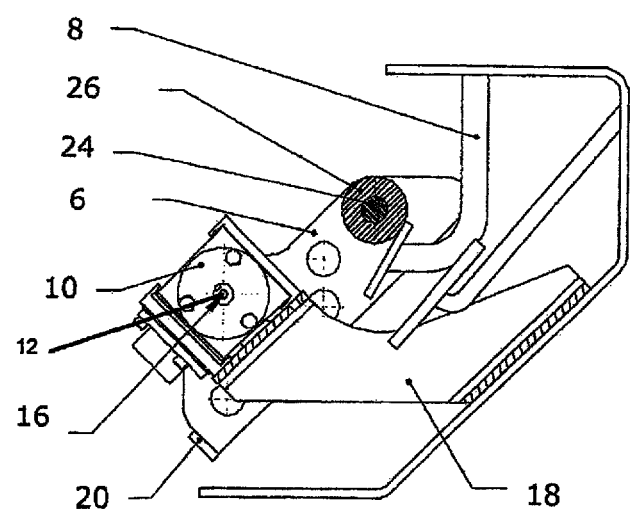
FIG. 3 is a sectional view along the line A-A of the pedal system as shown in FIG. 2.
Figure 7:
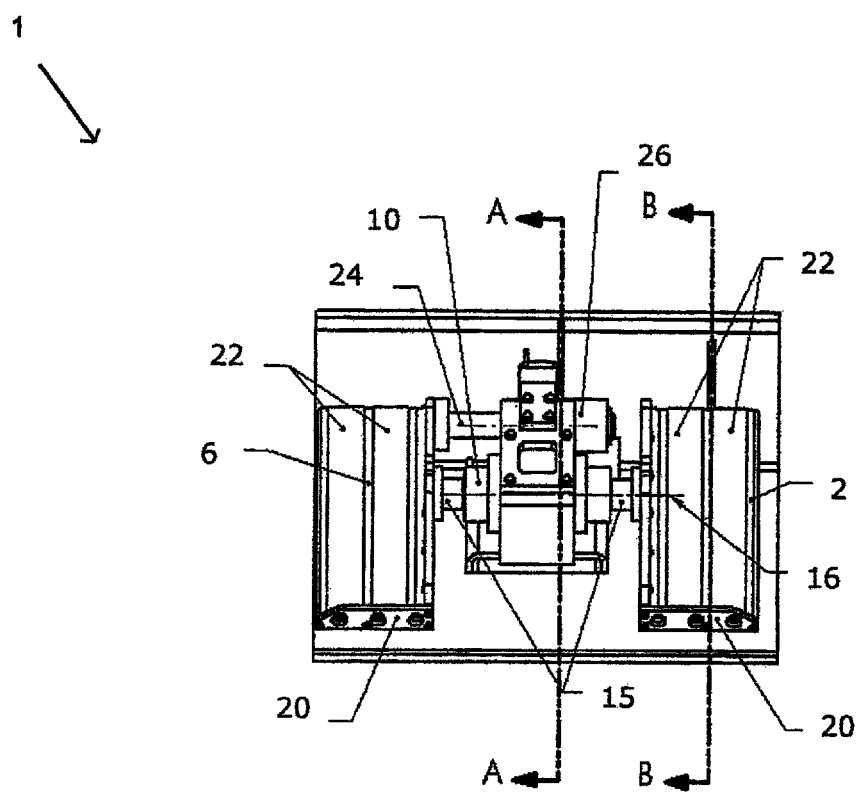
FIG. 7 is a front view of the pedal system shown in FIG. 5.
Figure 8:
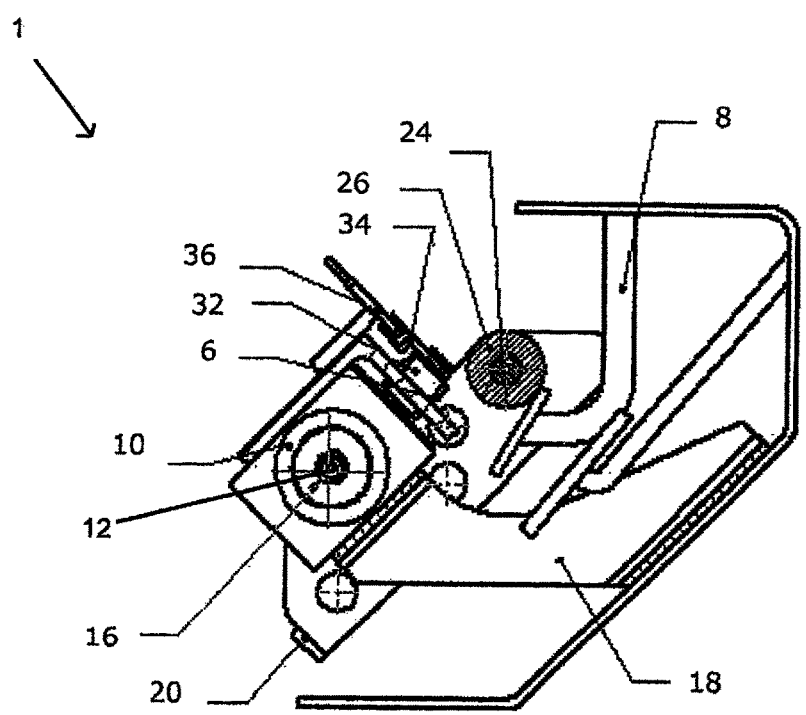
FIG. 8 is a sectional view along the line A-A of the pedal system as shown in FIG. 7.

In one embodiment in accordance with the specification, the two pedals (2, 6) of the pedal system (1) can be L-shaped, with one side of the L-shape serving as support for driver's feet and the other connecting the pedals (2, 6) to the motion inverter means (10) through flange connectors (15) installed on the output shafts (12, 14) of the motion inverter means (10), as shown in FIGS. 2 and 7. The centerline of the output shafts (12, 14) can be so located such as to ensure that it is in an approximate height alignment with the driver's ankles, for the reasons discussed above.

Heel locators (20) can also be provided that can be bolted near the heel end of the pedals (2, 6), as shown in FIGS. 3, 4, 8 and 9, to align the driver's ankles with the motion inverter output shafts (12, 14) along the length of the pedals (2, 6). Pedals (2, 6) can also be padded with friction lining (22), as shown in FIGS. 2 and 7, for better adherence with driver's feet.

In one embodiment in accordance with the specification, the left foot pedal (6) can feature a cantilevered shaft (24), mounted on the side, as shown in FIGS. 2, 3, 7 and 8, on which a left foot roller (26) can rotate. The latter acts upon the vehicle brake pedal (8), when the left foot pedal (6) is pushed down. When that happens, the right foot pedal (2) moves up in the air (raised with respect to the neutral position), losing contact with the vehicle gas pedal (4).

Figure 4:
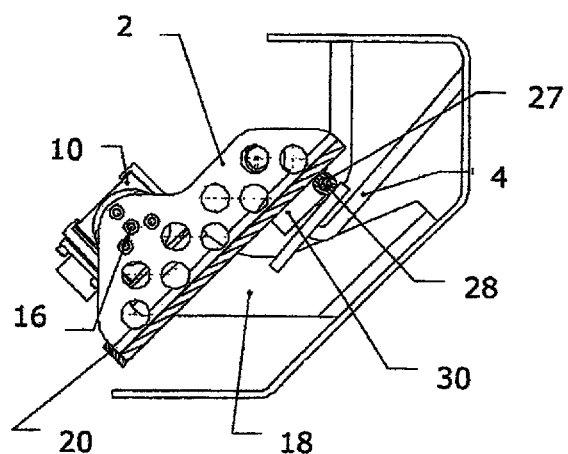
FIG. 4 is a sectional view along the line B-B of the pedal system as shown in FIG. 2.
Figure 5:
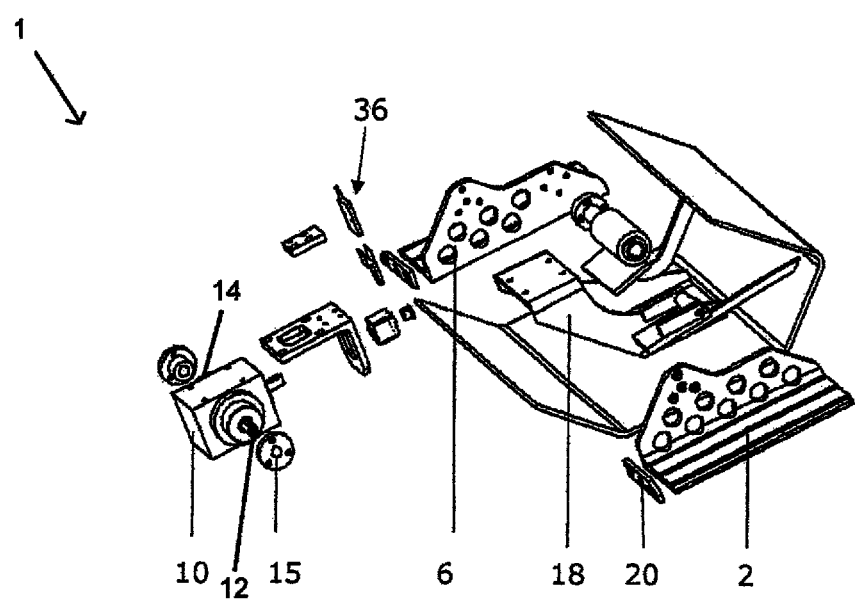
FIG. 5 is an exploded view of another example embodiment of the pedal system.
Figure 6:
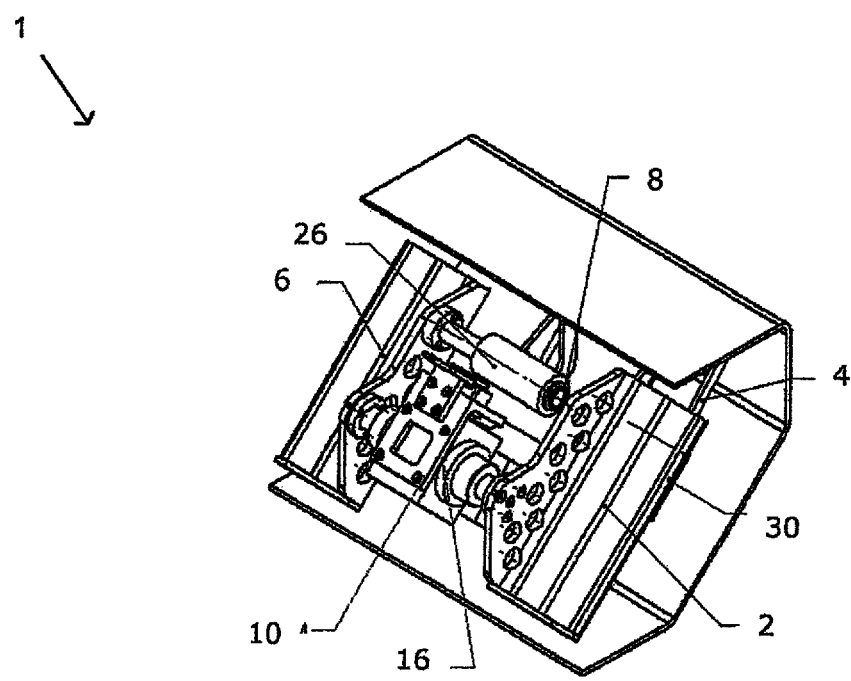
FIG. 6 is an isometric view of the pedal system shown in FIG. 5.
Figure 9:
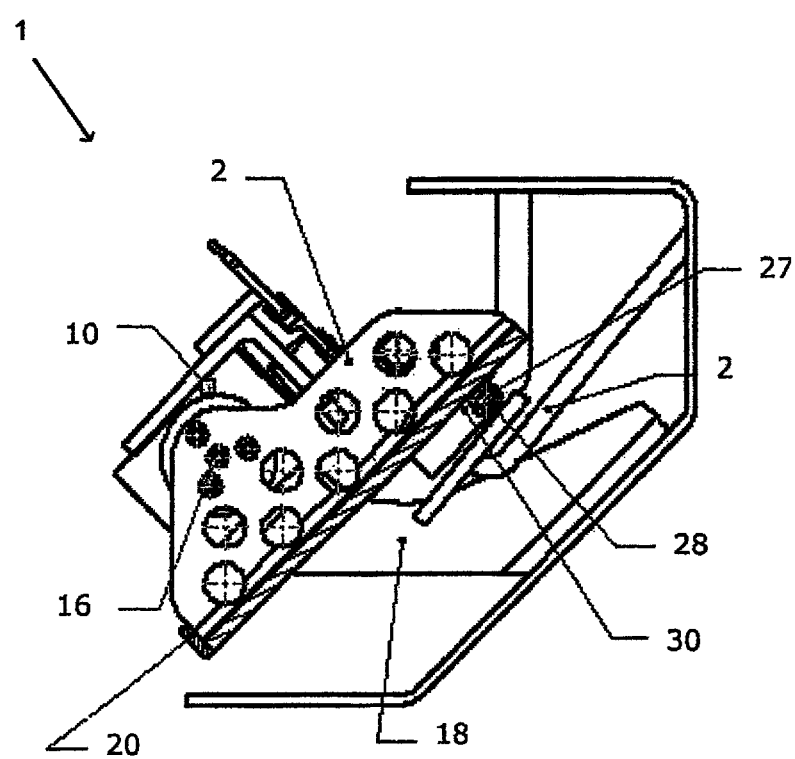
FIG. 9 is a sectional view along the line B-B of the pedal system as shown in FIG. 8.

In another embodiment in accordance with the specification, a right foot roller (27) is mounted, on its shaft (28) and support bracket (30), under the right foot pedal (2), as can be seen in FIGS. 4 and 9, and it presses the vehicle gas pedal (4) down, when the right foot pedal (2) goes down. Under these circumstances, the left foot pedal (6) leaves the vehicle brake pedal (8) behind and lifts in the air.

Figure 10:
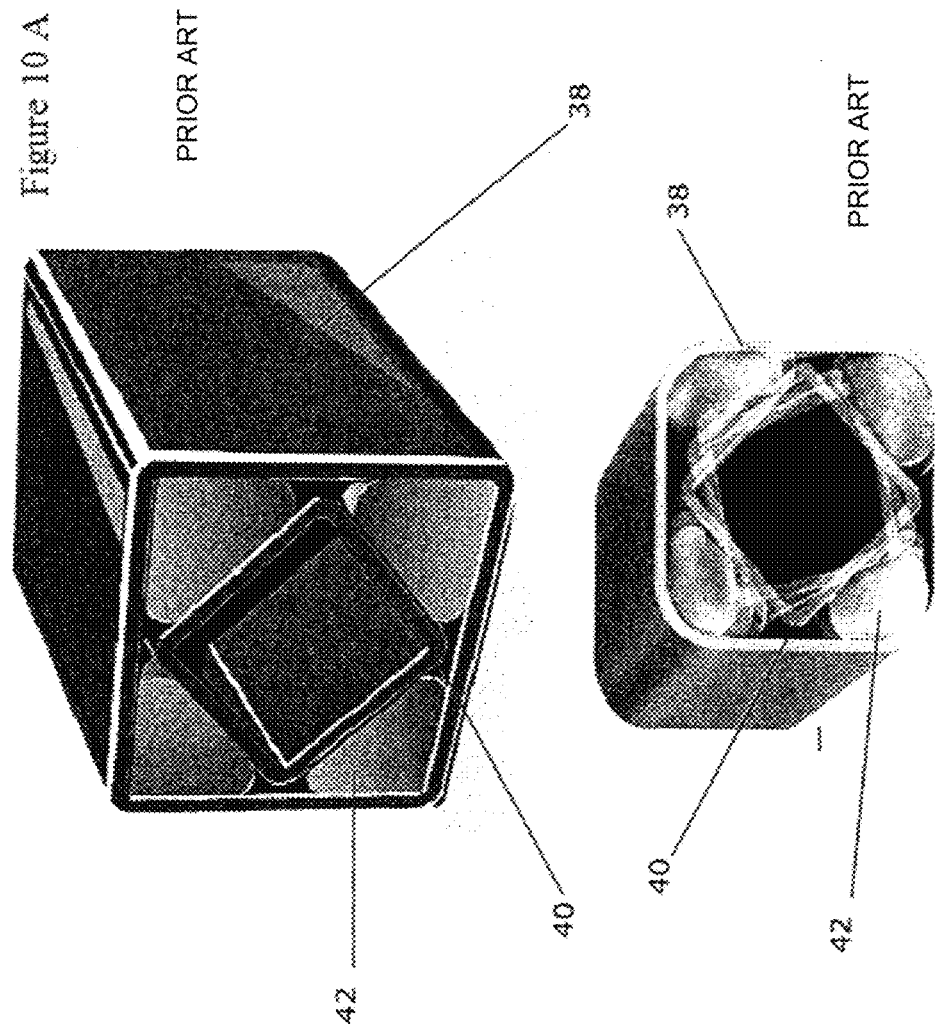
FIG. 10 A shows an embodiment of a torsion spring that is uncompressed for use in an embodiment of the pedal system.

In a further example embodiment, with reference now to FIGS. 5 to 9, the pedal system (1) can be provided with a biasing means (32) biasing the right and left foot pedals (2, 6) towards a neutral position. The biasing means (32) used in accordance with the specification is not particularly limited, and can be for example and without limitation a torsion spring. In one embodiment, for example and without limitation, the biasing means is a bi-directional torsion spring that can be mounted onto the centre shaft of the inverter means (10), thereby circumscribing the centre shaft. Its role is to bring the motion inverter means (10) in the neutral position, when no force is applied to the pedals (2, 6). In a further embodiment in accordance with the specification, a Rosta™ suspension unit can be used (FIG. 10), as would be understood in the art. The Rosta™ suspension unit consists of a steel square bar (38) coaxially mounted inside a steel square tube (40). The two steel parts are rotated by 45 degrees relative to each other. Four (round) rubber rods (42) are compressed into the four spaces created by each external square tube corner with its respective side of the central square bar. When one steel component is held stationary and the other is rotated about their common axis, the four rubber rods are squeezed even further, yielding but opposing the motion, like a spring. When the rotating torque ceases, the four rubber rods release their spring energy and bring the rotated component in its neutral position and the whole assembly in its equilibrium position. Additional information about the Rosta™ suspension unit can also be found on www.rostainc.com other biasing members are also possible.

In a further example embodiment, referring still to FIGS. 5 to 9, the pedal system (1) further comprises a detector that can sense and can communicate the position or relative position of the right or left foot pedals (2, 6). In one embodiment, for example and without limitation, the detector includes an activator (34) and an angle sensor (36). The angle sensor (36) can be a blade-shaped, solid-state inductive sensor, such as for example, an angle sensor made by Gill Sensors™ as would be understood in the art. The activator (34) can be a U-shaped piece of ferro-magnetic material. The motion of the activator (34) relative to the blade angle sensor (36) modifies the magnetic field of the latter and therefore induces in it an electrical current. Additional information about such sensors and how they can also be found on www.gillsensors.co.uk and http://www.gillsensors.co.uk/content/datasheets/25mm.pdf. The electric current induced, is used to measure the angle of motion and hence can be sent to a controller as a signal that is proportional to the angle of motion. As the angle sensor (36) can be programmed to work on a range of +/−30.degree., the controller must decide whether to accelerate the car, i.e. send the signal to the throttle actuator, or brake it by sending the signal to the actuator connected to the master cylinder of the braking system. Such vehicle systems which can receive the signals may be referred to as "drive by wire" systems, or the like. In some example embodiments, it can be appreciated that this single angle sensor (36) may be used to sense both acceleration and braking, since the right and left foot pedals (2, 6) are known to be opposing.

It can be appreciated that example embodiments of the pedal system (1) may be installed onto existing vehicles, for example, to engage the existing gas and brake pedals. In other example embodiments, the pedal system (1) may be installed at the manufacturing level to act as a replacement to the existing gas and brake pedals. In such embodiments, the detector may send appropriate signals for acceleration and deceleration control of the vehicle, which may be a "drive by wire" vehicle. Example embodiments, without intending to be limiting, may apply to vehicles having two pedals, and related vehicles which may be automatic gearboxes, continuous variable transmission, or double-clutch gearboxes, as would be understood in the art.

It can be appreciated that example embodiments may allow the driver to use both feet for accelerating, modulating speed and braking, wherein both feet are supported by pedals. As a consequence, braking time may be reduced which translates into short stopping distance. Further, less pain and therefore distraction from driving for people with leg/foot mobility problems (e.g. arthritis, foot bursitis etc.). Further, example embodiments may prevent and reduce right knee pain for professional drivers. Example embodiments may assist people having poor eye-foot/leg coordination in avoiding accidents. The elderly may fall in this category, but there are also people who have this unfortunate trait at any age. Example embodiments may allows left foot braking without the risk of depressing both pedals (gas and brake) at the same time, stalling the engine and therefore losing control of the car.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims.

Therefore, the embodiments of the invention in which an exclusive property or privilege is claimed are defined in the following appended claims.

Alternative Embodiment

Figure 11:
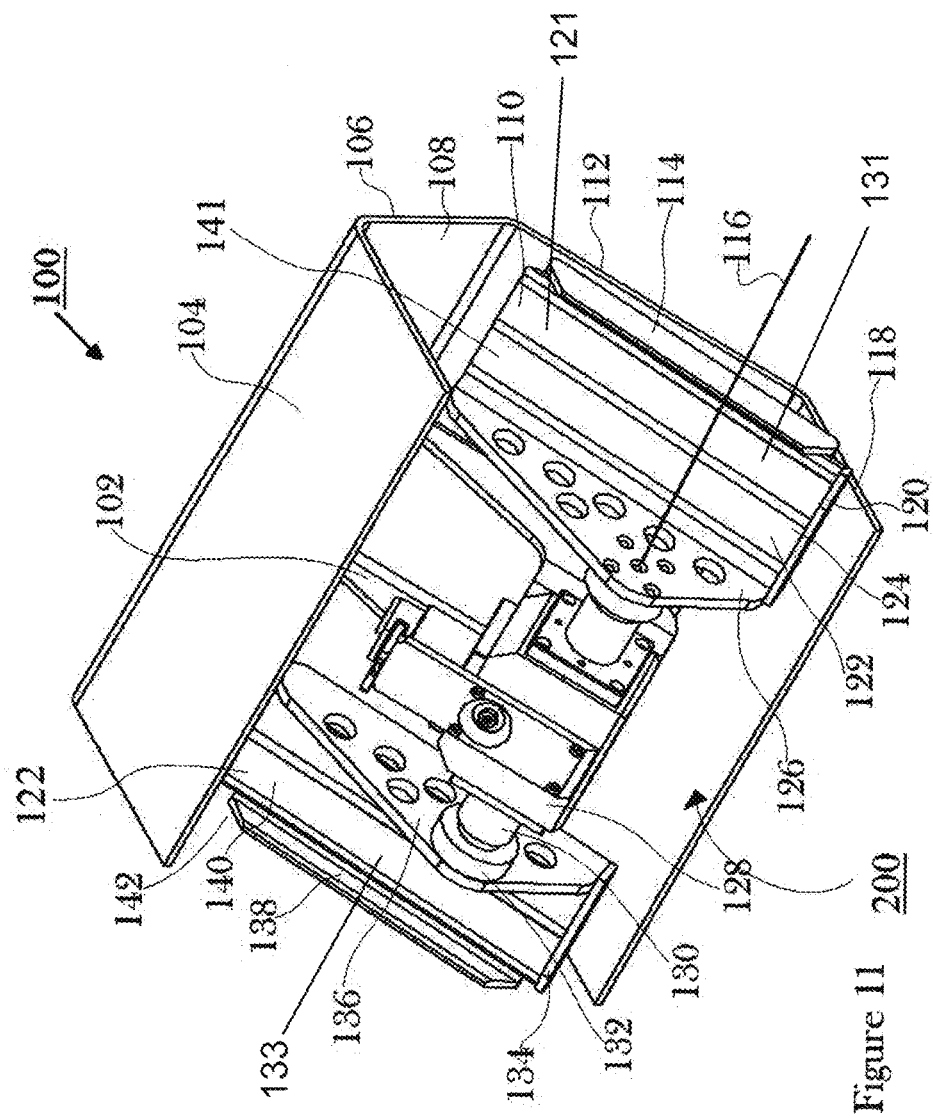
FIG. 11 is a schematic front perspective view of an alternate embodiment of the pedal system.

An alternate embodiment of the present concept is a pedal system shown generally as 100 in FIG. 11.

Referring now to FIG. 11, the major components of pedal system 100 are a left foot pedal 140, normally corresponding to the brake, a right foot pedal 141, normally corresponding to the throttle and a motion inverter shown generally as 200 mounted to a floorpan 108.

The floorpan 108 includes an underside of dash 104, a firewall 106, an inclined base 112, and a floor 118.

The left foot pedal has a left side guide 138, right side guide 136, heel rest 134 and foot pad 122.

The right foot pedal has an inboard side guide 126, outboard side guide 114, right heel rest 120 and foot pad 122. The reader will note that in the embodiment shown the left foot pedal and right foot pedal are mirror images of each other and each contain the same components in mirror image relationship. In this specification generally foot pad 122 refers to both right foot pad 131 and left foot pad 133.

These guides (left side guide 138, right side guide 136, inboard side guide 126, and outboard side guide 114) and rests (left heel rest 134 and right heel rest 120) are vertically upstanding oriented perpendicular to their respective foot pad 122.

Referring now to FIGS. 11 to 16 which show the motion inverter 200 or components thereof.

The motion inverter 200 includes a housing 128 upon which the following are mounted: two rocker arm assembly shown generally as 280, a rocker yoke assembly shown generally as 221, a magnet holder 218, a position sensor 236 and sensor tab 202.

Figure 12:
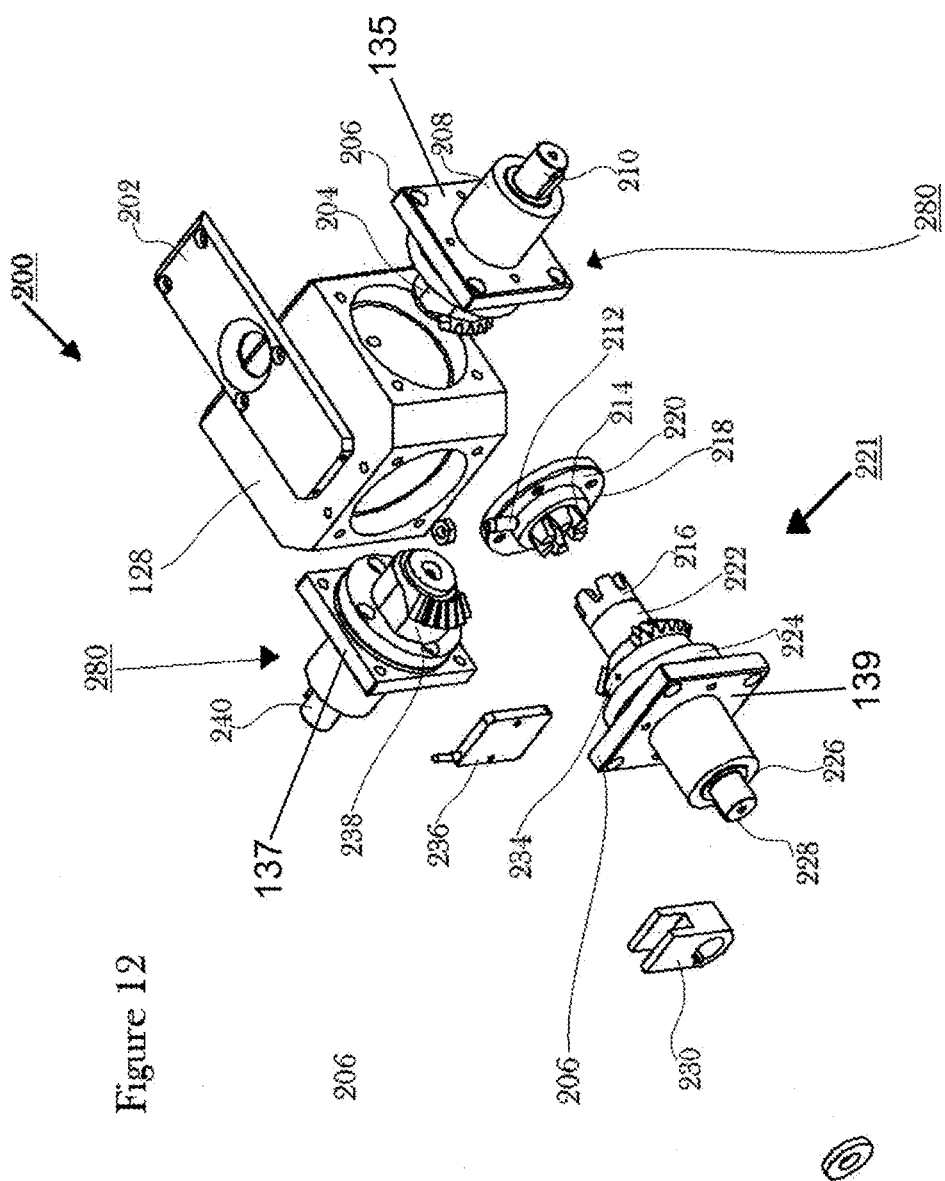
FIG. 12 is a schematic exploded rear assembly perspective view of a motion inverter component of an alternate embodiment of the pedal system.
Figure 13:
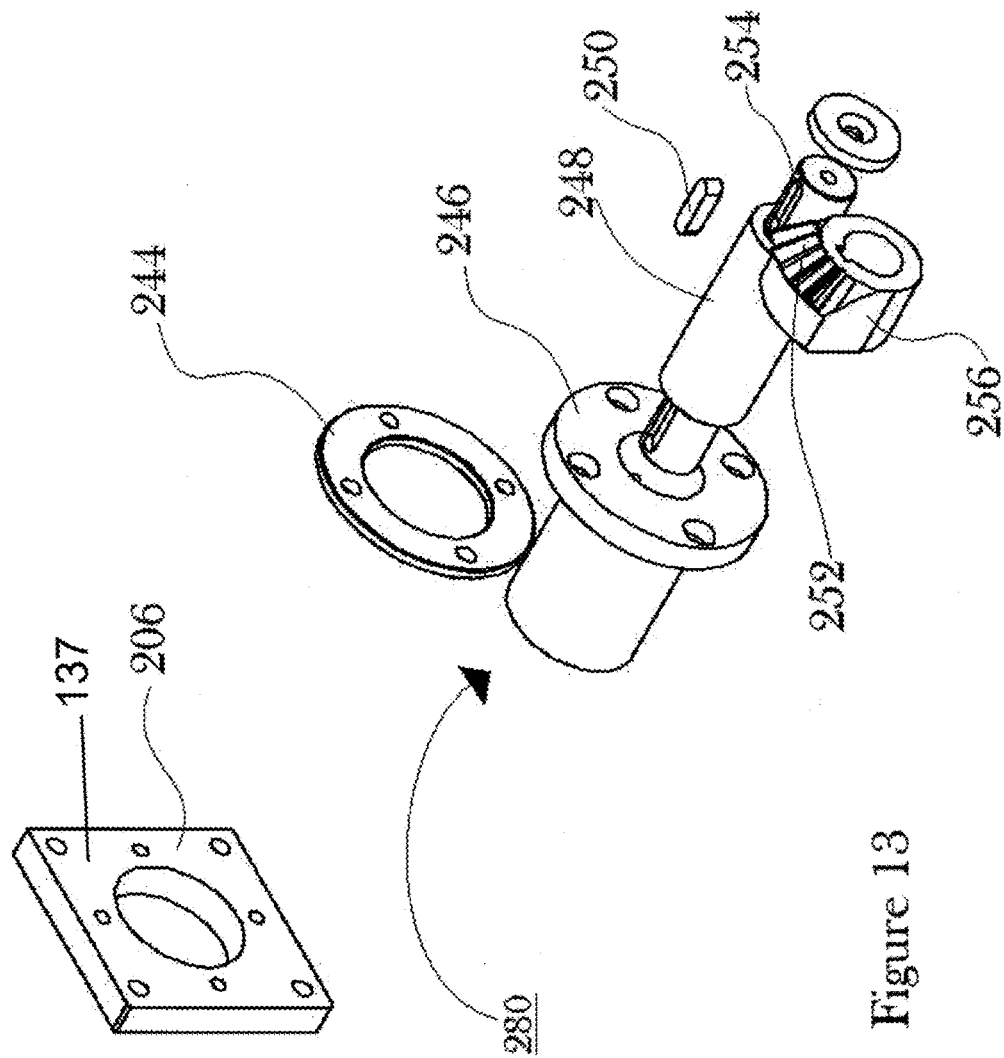
FIG. 13 is a schematic exploded assembly view of the pedal shaft portion of a motion inverter component of an alternate embodiment of the pedal system.

The rocker arm assembly 280 is shown in isolation in FIG. 13 and includes a rocker arm 256 having gear teeth 252 which is secured to a pedal shaft 248 via a key 250 coupled with a key seat 254. The pedal shaft 248 is further attached to a flanged bearing 246 mounted in a mounting flange 206. Flange 206 in general refers to three mounting flanges namely right mounting flange 135, left mounting flange 137, and center mounting flange 139 shown in FIG. 12.

A centring shim washer 244 is captivated between the mounting flange 206 and flanged bearing 246 to adjusting the position and meshing of gear teeth 252 by adjusting the thickness of the centring shim washer 244.

Rocker yoke assembly 221 has an outboard end 228, an inboard end 222 and further includes a centring magnet 216 mounted on the inboard end 222, a sensor reference 230 mounted on the outboard end 228, idler yoke 224, mounting flange 206, and idler shaft 226.

Referring specifically to FIG. 12, the rocker arm 256 shown in FIG. 13 can be either a left rocker arm 204 or a right rocker arm 238 depending on is position in the motion inverter 200.

The left rocker arm 204 and right rocker arm 238, connect to the left pedal shaft 210 and right pedal shaft 240 respectively.

Each of the left rocker arm 204 and right rocker arm 238 engage with the rocker yoke assembly 221, specifically the idler yoke 224 via a geared connection, such that clockwise rotation of one rocker arm translates to counter clockwise rotation of the other rocker arm.

Referring to FIG. 11, the motion inverter 200 is mounted in between the spaced apart right foot pedal 141 and left foot pedal 140.

The right foot pedal 141 and the left foot pedal 140 pivotally connected about a pivot axis 116 to the motion inverter 200.

Figure 19:
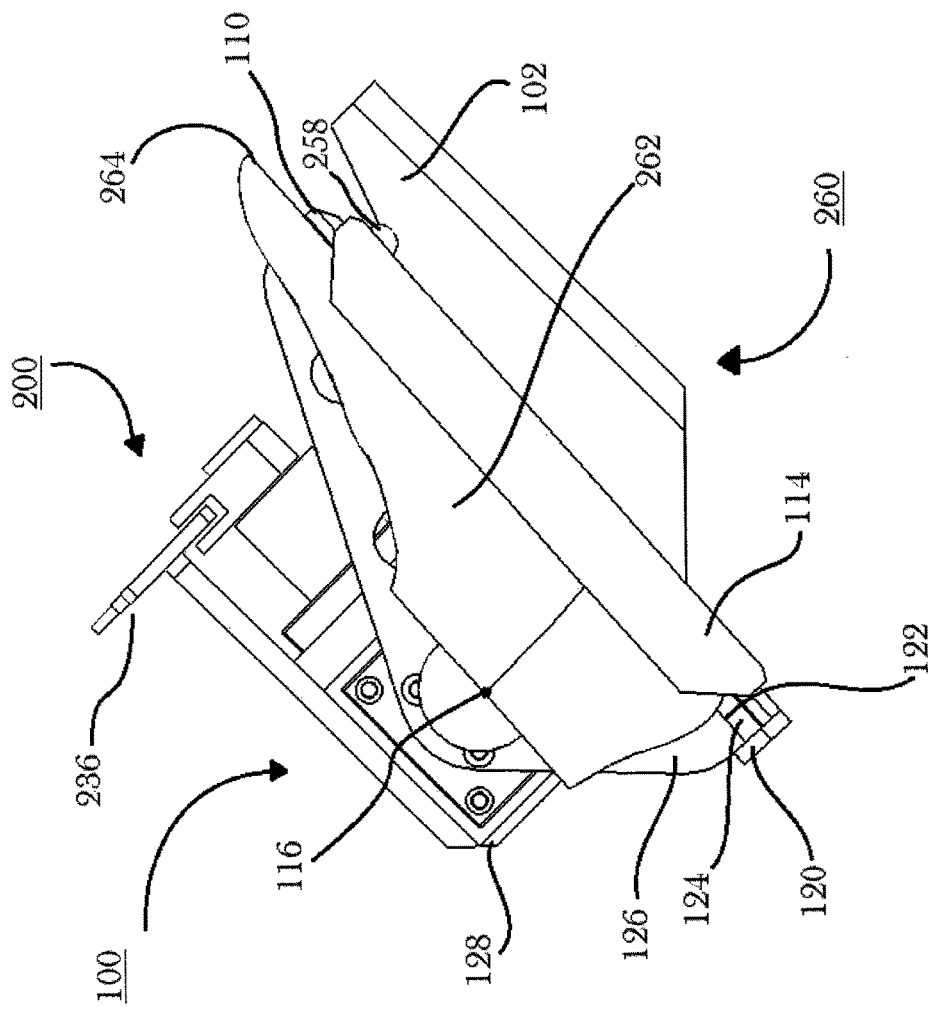
FIG. 19 is a schematic right side elevation view showing an alternate embodiment of the pedal system in a full throttle position with a portion of a human foot shown on the foot pad.

Referring to FIGS. 11 and 19, the pivot axis 116 coincides substantially with the pivot axis of the tibio-tarsal joint of a foot 262 when contacting the foot pad 122.

Figure 17:
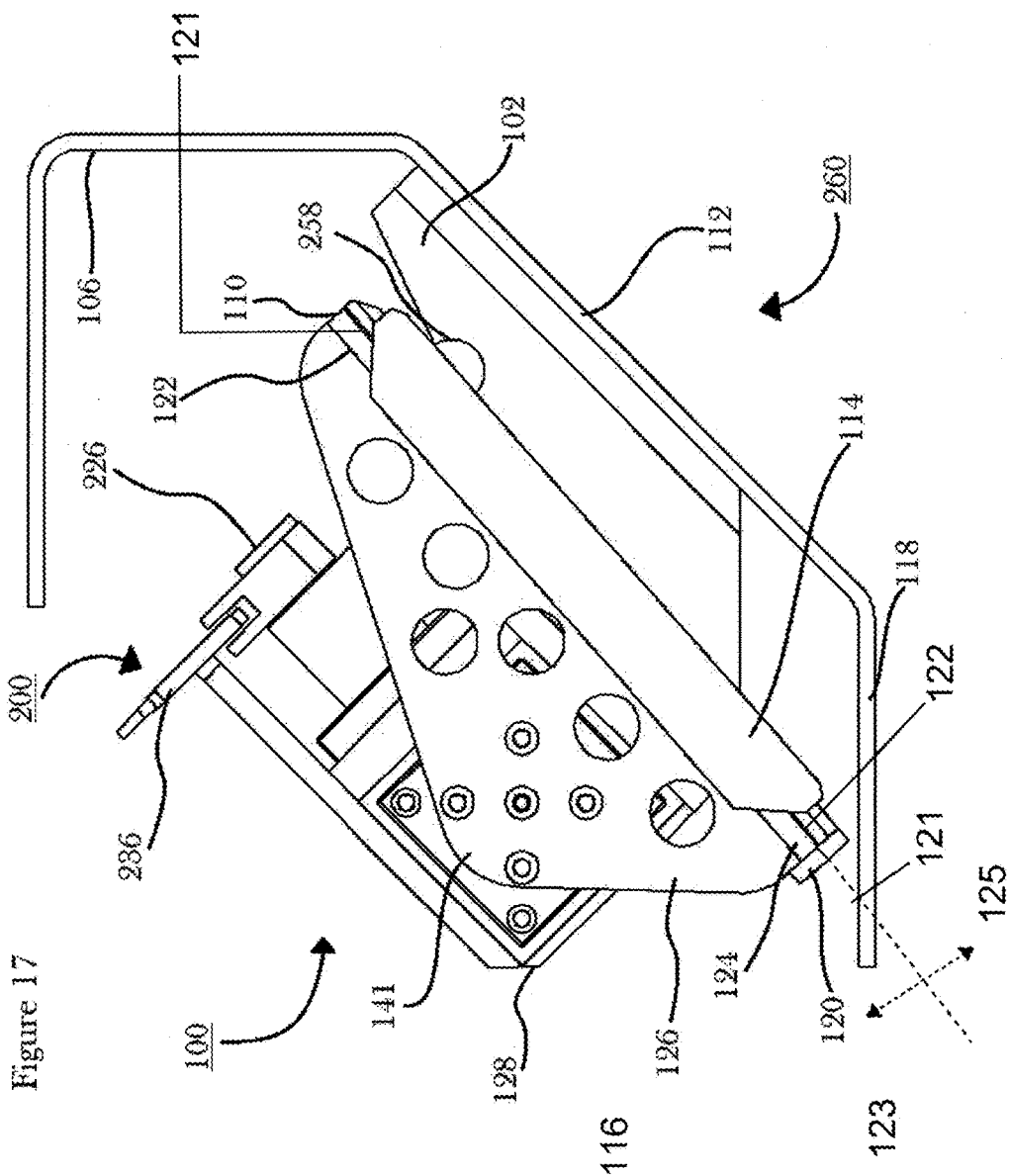
FIG. 17 is a schematic right side elevation view showing an alternate embodiment of the pedal system in a neutral position.

Referring to FIGS. 11 and 12, the pedal system 100 includes the centring magnet 216 with one set of magnetic poles, and a spring magnet 214 having cooperating set of magnetic poles mounted onto the magnet holder 218 such that like pole repulsion is used to return the pedals to a neutral position 260 shown most clearly in FIG. 17.

The neutral position 260 has both left foot pedal 140 and right foot pedal 141 at substantially identical positions relative to the floor 118.

Once in the neutral position 260 the idler yoke 224 with a yoke dimple 234 for engaging with a ball of a spring and ball plunger 212 (also known as spring plunger) positively indexes the neutral position 260.

Figure 14:
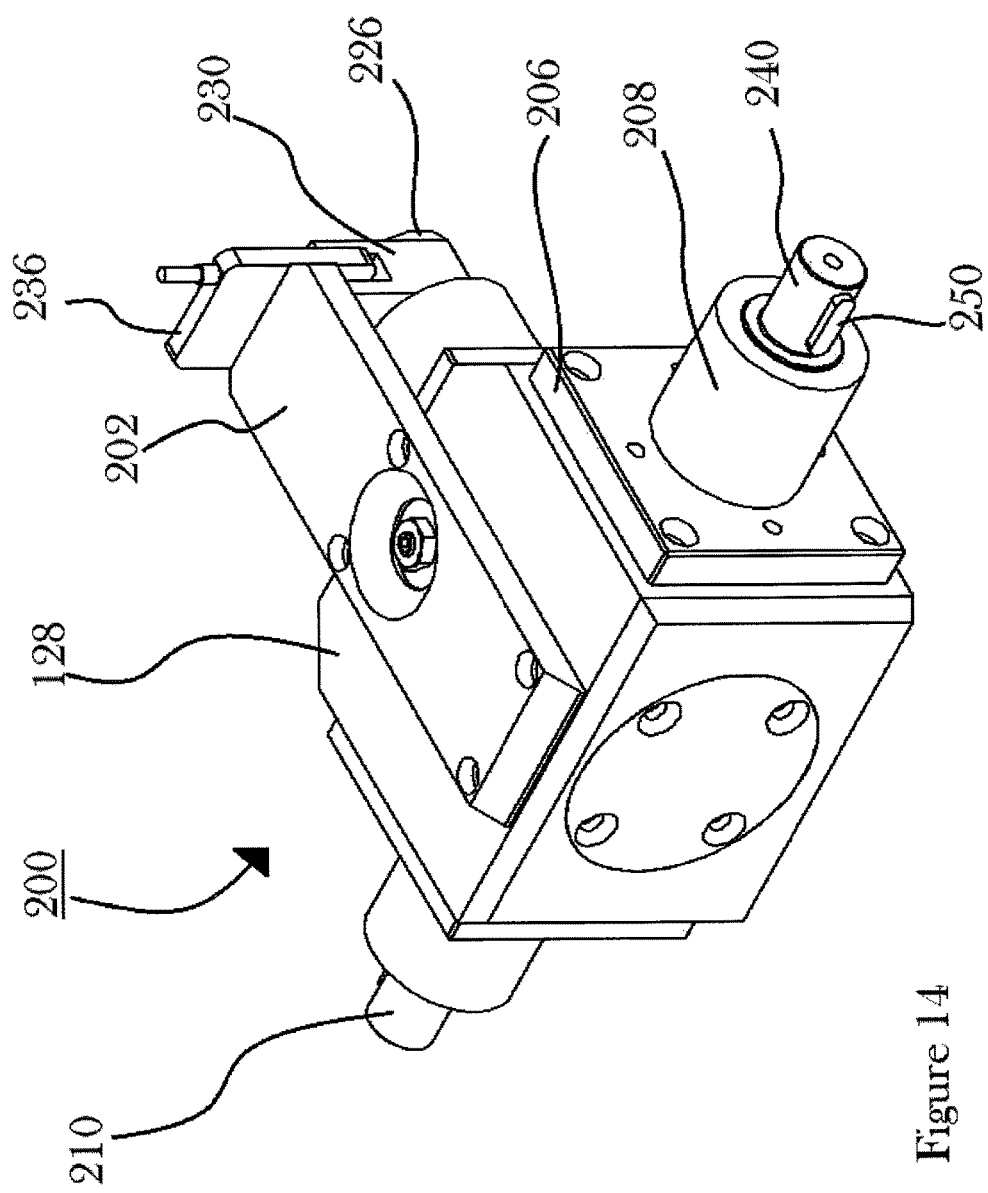
FIG. 14 is a schematic front assembly view of a motion inverter component of an alternate embodiment of the pedal system.
Figure 15:
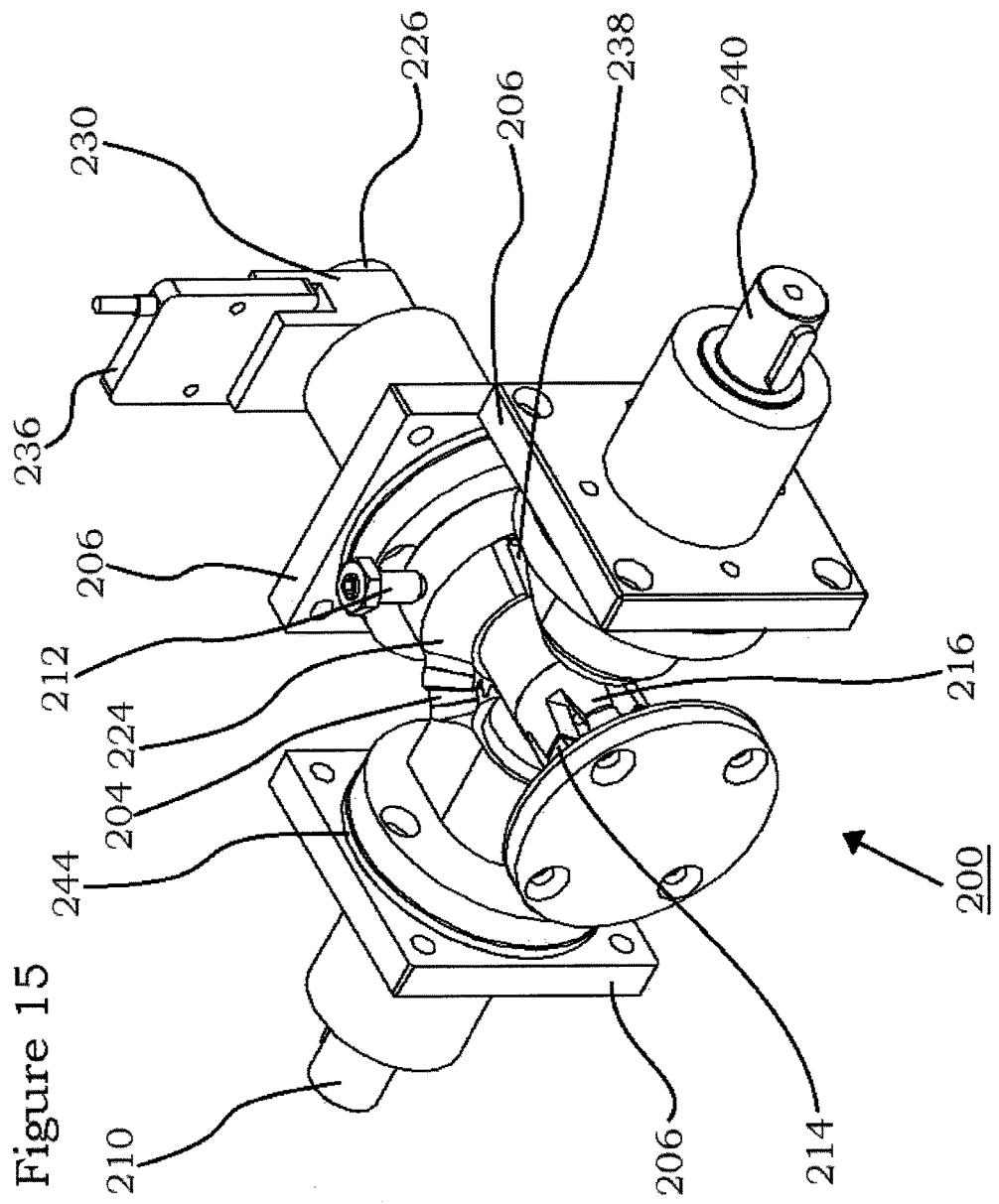
FIG. 15 is a schematic front assembly view of a motion inverter component of an alternate embodiment of the pedal system with housing removed to show internal workings.
Figure 16:
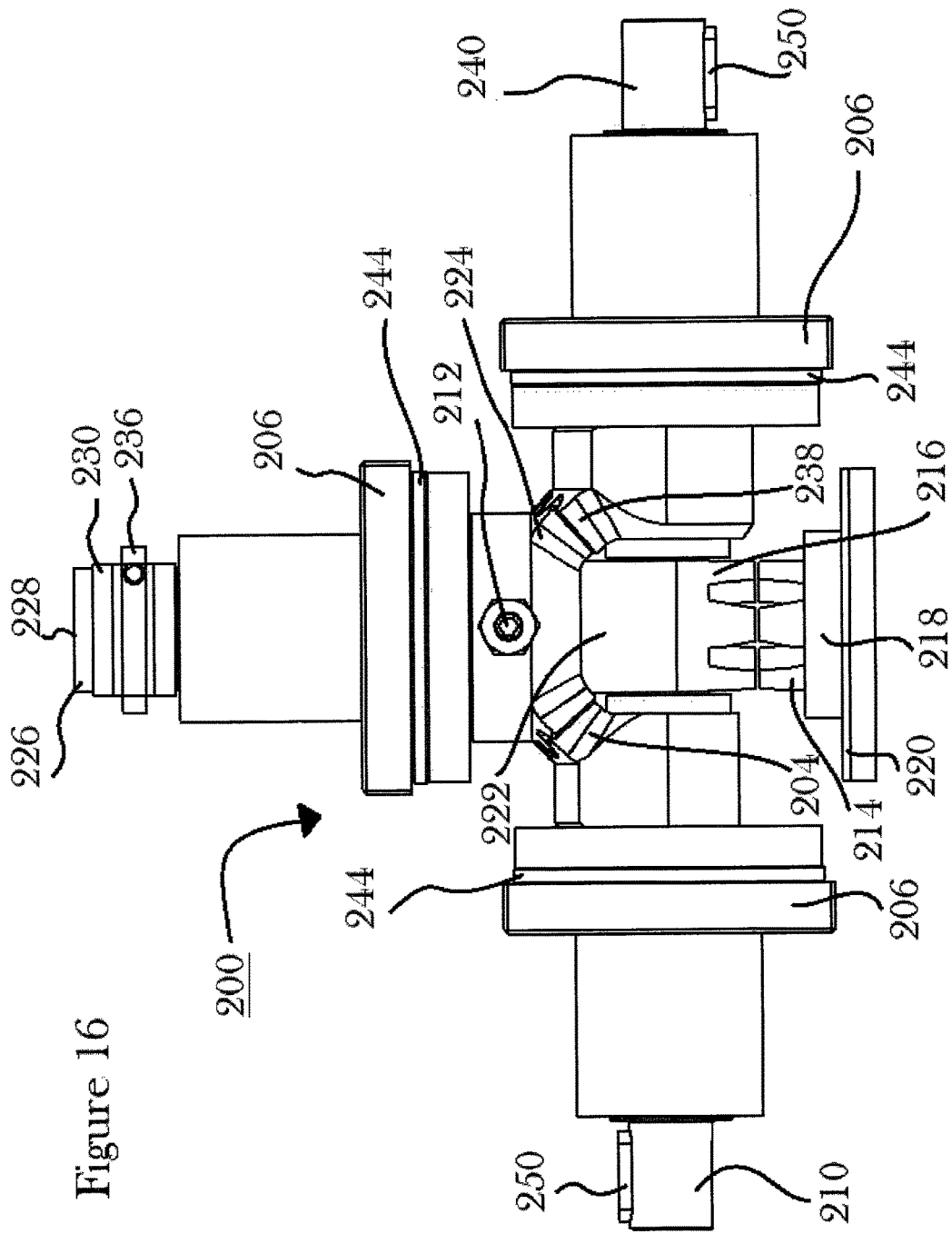
FIG. 16 is a schematic top plan view of a motion inverter component of an alternate embodiment of the pedal system with housing removed to show internal workings.

Referring to FIGS. 14 to 16, the sensor tab 202 supports the position sensor 236 and is attached to the housing 128.

The position sensor 236 interacts with a sensor reference 230 mounted onto the outboard end 228 of the idler shaft 226 such that the sensor reference 230 pivots through the position sensor 236 indicating the position of the coupled foot pedals; namely, left foot pedal 140 and right foot pedal 141.

Referring to FIG. 11 and FIG. 17, the housing 128 of the motion inverter 200 is rigidly mounted to the floor 118 of the floor pan 108 via the mounting bracket such that that the left foot pedal 140 and right foot pedal 141 do not contact the floor 118.

It will be apparent to a person skilled in the art that the pedal system 100 need not be mounted overtop but instead of existing vehicle pedals; namely, the throttle and brake.

Figure 20:
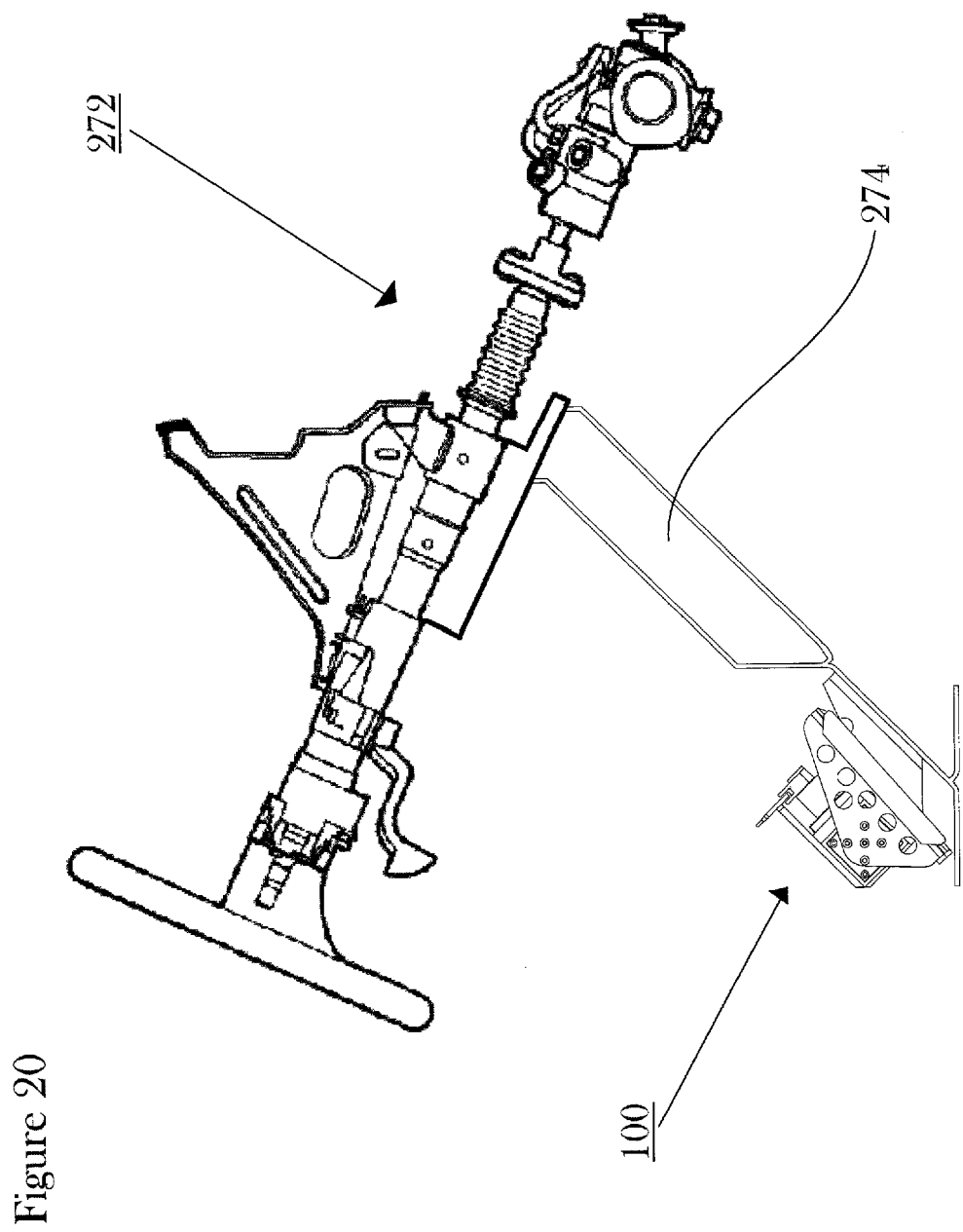
FIG. 20 is a schematic right side elevation view of an alternate embodiment of the pedal system mounted to a steering column.
Figure 21:
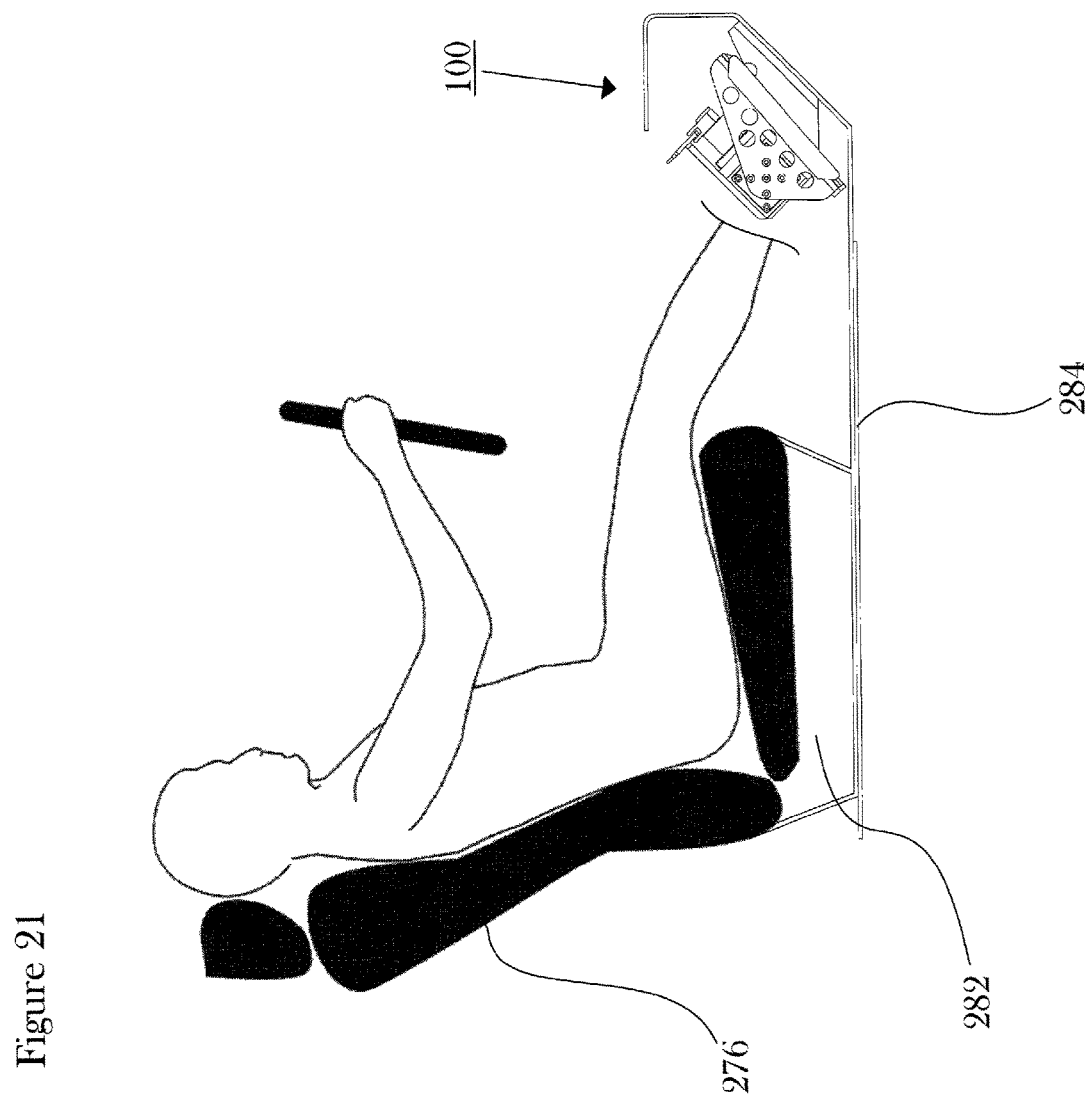
FIG. 21 is a schematic right side elevation view of an alternate embodiment of the pedal system mounted to a seat.

By way of example: FIG. 20 shows the pedal system 100 rigidly connected to a steering column 272 via a steering mounting bracket 274. Further, FIG. 21 shows the pedal system 100 rigidly connected to a seat 276 at a base 282 such that the pedal system 100 may also utilize existing rails 284 or similar to adjust the seat 276.

It will also be apparent to a person skilled in the art that the pedal system 100 need not be mounted such that a single fixed pedal position is available.

By way of example, FIG. 22 shows the pedal system 100 connected to an indexing rail system 300. The indexing rail system 300 includes: a mounting plate 302, a track 304 and a carriage 306. The indexing rail system 300 permits selectively adjusting or indexing the pedal position along the track direction 310.

The track 304 is secured to a vehicle structure via the mounting plate 302. The carriage 306 is connected to the housing 128 of the motion inverter 200 via an adjustment bracket 308. The carriage 306 slidably connects to the track 304 such that pedal position of the pedal system 100 can be indexed selectively.

In Use

Figure 18:
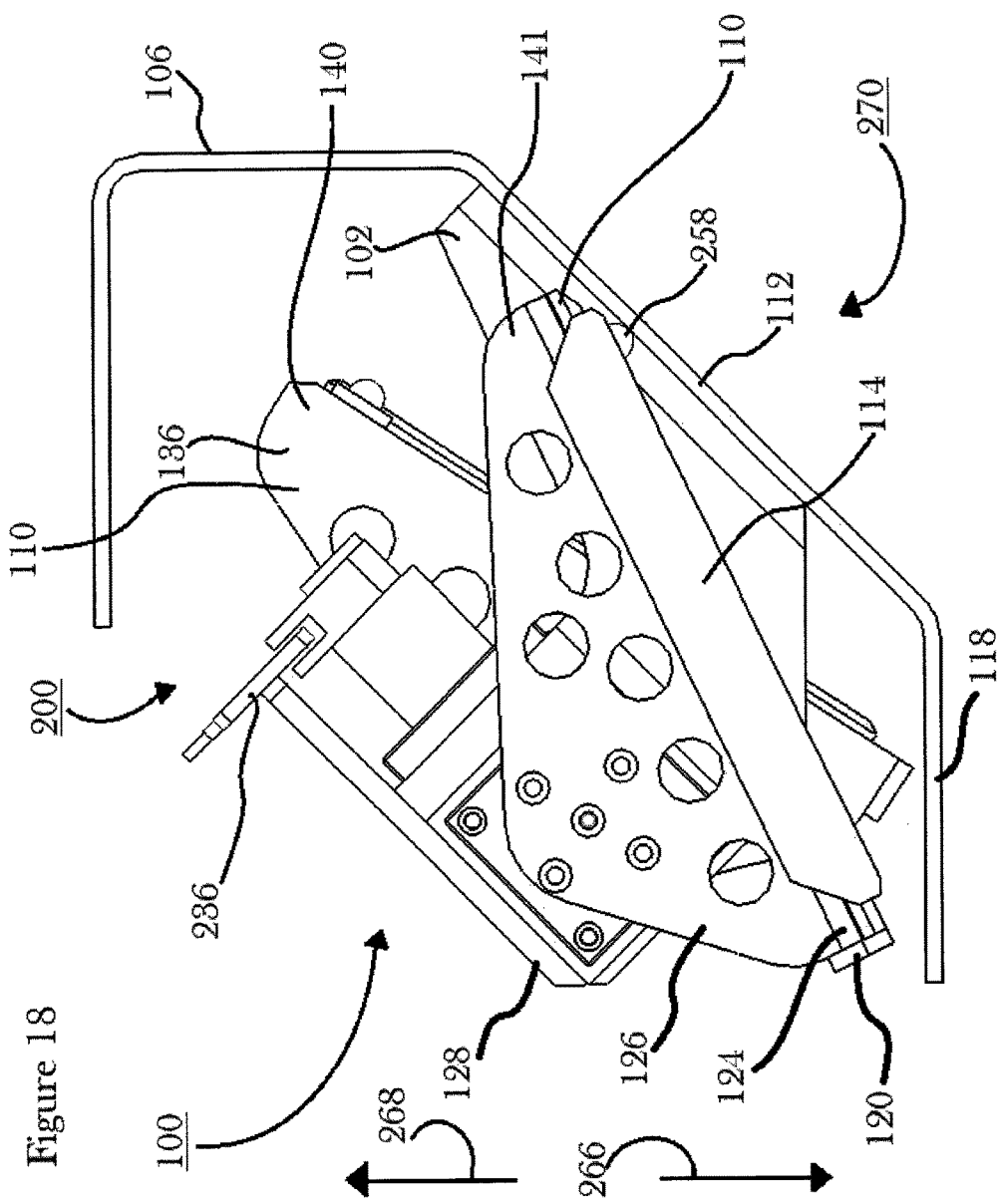
FIG. 18 is a schematic right side elevation view showing an alternate embodiment of the pedal system in a full throttle position.

FIGS. 17 to 19 show the pedal system 100 in use.

Referring now to FIG. 17 the pedal system 100 is shown in the neutral position 260 wherein the right foot pedal 141 and the obscured left foot pedal 140 are in a substantially identical position relative to the floor 118.

Referring to FIG. 19, each pedal includes a foot pad 122 for receiving the foot sole 264 thereon such that the pivot axis 116 is above the foot pad 122 and between a pedal toe 110 and a pedal heel 124. Depressing the pedal heel 124 and pedal toe 110 of one pedal pivots the other pedal in opposite directions. Therefore it is possible to drive using one foot which could activate both the brake and throttle.

The motion of the left foot pedal 140 and right foot pedal 141 are coupled through the idler shaft 226; therefore, the position of each pedal can be ascertained from the angular position of the idler shaft 226 using the position sensor 236.

The position sensor 236 electronically communicates the pedal position to a controller, such that depressing the toe of the right pedal beyond the neutral position proportionately increases a vehicle throttle, whereas depressing the toe of the left pedal beyond the neutral position proportionately increases a vehicle brake.

Referring to FIG. 12 and FIGS. 17 to 18 to illustrate by way of example how the pedal position is ascertained.

FIG. 18 shows the pedal system 100 in a full throttle position 270 where the right foot pedal 141 is depressed such that its pedal toe 110 rests in its extreme position in the downward direction 266 captivated by a stop 258 which rests against the inclined base 112 and the foot 262 applying force in a downward direction 266. The left foot pedal 140 in a full throttle position 270 is correspondingly raised such that its pedal toe 110 rests in its extreme position in the upward direction 268.

An example of moving from the neutral position shown in FIG. 17 to the full throttle position 270 shown in FIG. 18 is as follows: the pedal toe 110 of the right foot pedal 141 is urged in the downward direction 266 which rotates the right rocker arm 238 and, via a geared connection, rotates the idler yoke 224 in the opposite direction.

Rotation of the idler yoke 224 correspondingly rotates the sensor reference 230 coupled through the idler shaft 226.

The sensor reference 230 pivots through the position sensor 236 which is calibrated to read rotation of the sensor reference 230 and output the position of the coupled foot pedals; namely, left foot pedal 140 and right foot pedal 141. The position of the coupled foot pedals is electronically communicated to a controller.

When the foot 262 ceases applying force in a downward direction 266 to the right foot pedal 141, it is no longer captivated between the foot 262 and stop 258, the like pole repulsion of the centring magnet 216 and spring magnet 214 urge the pedal system to a neutral position 260 indexed by the yoke dimple 234 and ball and spring plunger 212.

Varying the thickness of the shim 220 modifies the effective spring constant of the two magnets; namely, the centring magnet 216 and spring magnet 214.

I claim:

1. A pedal system for controlling throttle and braking in a vehicle, the pedal system comprises:
    a) a right foot pedal and a left foot pedal are spaced apart and pivotally connected about a pivot axis to a three-bevel-gear motion inverter, each of the right and left foot pedals includes a respective neutral position configured such that when the right and left foot pedals are in the respective neutral positions throttle and braking is not applied;
    b) the three-bevel-gear motion inverter is mounted in between the right and left foot pedals such that the three-bevel-gear motion inverter is configured to cause opposing pivoting movement between the right and left foot pedals;
    c) a position sensor configured to sense a respective pedal position for each of the right and left foot pedals, such that depressing a respective toe of the right foot pedal beyond the respective neutral position of the right foot pedal proportionately increases throttle, whereas depressing a respective toe of the left foot pedal beyond the respective neutral position of the left foot pedal proportionately increases braking; and
    d) wherein each of the right and left foot pedals includes a respective foot pad defining a respective foot pad plane and a respective heel, each of the right and left foot pedals includes a respective axis extending perpendicular to the respective foot pad plane in a respective direction away from a floor and intersecting the pivot axis, wherein for each of the right and left foot pedals the respective axis is between the respective toe and the respective heel.

2. The pedal system claimed in claim 1, wherein each of the right and left foot pedals including a respective vertically upstanding inboard side guide oriented perpendicular to the respective foot pad.

3. The pedal system claimed in claim 2, wherein each of the right and left foot pedals further including a respective vertically upstanding outboard side guard oriented perpendicular to the respective foot pad.

4. The pedal system claimed in claim 3, wherein each of the right and left foot pedals further including a respective vertically upstanding heel rest oriented perpendicular to the respective foot pad.

5. The pedal system claimed in claim 1, wherein the three-bevel-gear motion inverter including a right pedal shaft pivotally mounted and oriented along the pivot axis, the right pedal shaft configured to operably connect the right foot pedal to the three-bevel-gear motion inverter, the three-bevel-gear motion inverter further including a left pedal shaft pivotally mounted and oriented along the pivot axis, the left pedal shaft configured to operably connect the left foot pedal to the three-bevel-gear motion inverter.

6. The pedal system claimed in claim 5, wherein the three-bevel-gear motion inverter includes a housing with a left rocker arm and a right rocker arm connected to the left and right pedal shafts, respectively, each, respectively engaging with an idler shaft of the left and right rocker arms, a sensor reference is connected at an outboard end of the idler shaft to provide a position reference to the position sensor.

7. The pedal system claimed in claim 6, wherein the three-bevel-gear motion inverter includes a centering magnet with a set of magnetic poles mounted onto an inboard end of the idler shaft and a spring magnet with a cooperating set of magnetic poles mounted onto a magnet holder, such that centering is accomplished by using like pole repulsion to return the right and left foot pedals to the respective neutral positions.

8. The pedal system claimed in claim 7, wherein the position sensor further includes a sensor tab attached to the housing, the position sensor interacting with the sensor reference such that the sensor reference pivots through the position sensor indicating the respective pedal positions of the right and left foot pedals.

9. The pedal system claimed in claim 6, wherein the idler shaft includes an idler yoke with a yoke dimple, the yoke dimple for engaging with a ball of a spring and ball plunger for positively indexing the respective neutral positions.

10. The pedal system claimed in claim 6, wherein each of the left and right pedal shafts is pivotally mounted within a respective flanged bearing.

11. The pedal system claimed in claim 6, wherein the housing is connected to a floor mounting bracket configured to rigidly connect the pedal system above the floor such that the right and left foot pedals do not contact the floor.

12. The pedal system claimed in claim 6, wherein the housing is connected to a steering column mounting bracket for rigidly connecting the pedal system to a steering column such that the right and left foot pedals do not contact the floor.

13. The pedal system claimed in claim 6, wherein the housing connected to a seat mounting bracket for rigidly connecting the pedal system to a vehicle seat.

14. The pedal system claimed in claim 6, wherein the housing is connected to an indexing rail system for slidably connecting the pedal system to the floor such that a position of the pedal system, relative to the floor, can be indexed selectively.

* * * * *